United States Patent [19]

Fujii et al.

[11] 4,312,649
[45] Jan. 26, 1982

[54] FUEL VAPOR ARRESTING MEANS FOR MOTORCYCLE ENGINE FUEL SYSTEM

[75] Inventors: Hisashi Fujii, Akashi; Mikio Kamitake, Kobe; Ryohei Mimura, Kakogawa; Katsumi Umezawa, Kobe, all of Japan

[73] Assignee: Kawaski Jukogyo Kabushiki Kaisha, Kobe, Japan

[21] Appl. No.: 109,990

[22] Filed: Jan. 7, 1980

[30] Foreign Application Priority Data

Jan. 9, 1979 [JP] Japan ............................ 54-1678[U]

[51] Int. Cl.³ .................................................. B01D 53/04
[52] U.S. Cl. ......................................... 55/387; 137/38;
220/85 VS; 220/DIG. 33
[58] Field of Search .................... 55/387, DIG. 19;
137/45, 38; 220/85 VR, 85 VS, DIG. 33

[56] References Cited

U.S. PATENT DOCUMENTS

| | | | |
|---|---|---|---|
| 2,258,323 | 10/1941 | Gray | 137/45 |
| 2,496,883 | 2/1950 | McKalip | 55/DIG. 19 |
| 3,368,326 | 2/1968 | Hervert | 55/387 |
| 3,683,597 | 8/1972 | Beveridge | 55/387 X |
| 3,915,184 | 10/1975 | Galles | 137/45 |
| 4,041,967 | 8/1977 | Tsukisaka | 137/45 X |

Primary Examiner—John Adee
Attorney, Agent, or Firm—Fleit & Jacobson

[57] ABSTRACT

Motorcycle has a fuel tank formed with a fueling port which is closed by a filler cap. The filler cap comprises an outer and inner cap discs which are adapted to be engaged respectively with an outer and inner cap seats so as to define a buffer chamber between the cap discs. A vent hole is formed to open the inside of the tank to the buffer chamber which is in turn connected with a canister containing activated carbon particles. The buffer chamber functions to receive liquid fuel when the motorcycle is turned over and prevent the liquid fuel from passing to the canister.

5 Claims, 5 Drawing Figures

FUEL VAPOR ARRESTING MEANS FOR MOTORCYCLE ENGINE FUEL SYSTEM

The present invention relates to motorcycle fuel system and more particularly to vapor fuel recovering means for motorcycles.

In general, fuel tanks for motorcycles have fueling port caps which are formed with air vent or breathing holes so that fuel vapor which may be produced when the engine is inoperative may be allowed to pass through these holes to atmosphere possibly resulting in air pollution. In order to solve the problem, it has been proposed and widely adapted to lead the air vent hole to a canister containing activated carbon particles so that the fuel vapor containing gas is passed from the air vent hole through the activated carbon particles in the canister before it is discharged to the atmosphere. The fuel vapor is then absorbed by the carbon particles so that it is possible to prevent air pollution by the fuel vapor which may otherwise be discharged into atmosphere.

It has also been known to connect the canister containing the activated carbon particles with the inlet passage of the motorcycle engine so that the engine intake suction pressure is applied to the canister under operation of the engine. With this arrangement, the fuel vapor which has been absorbed by the activated carbon particles in the canister is drawn under the intake suction pressure to the engine intake system so that the absorbency of the carbon particles can be maintained for a prolonged period of time.

In such conventional arrangements, however, when the motorcycle is overturned, fuel in liquid form may be allowed to flow through the vent hole into the canister making the carbon particles wet and thereby destroying the absorbency of the particles.

It is therefore an object of the present invention to provide fuel vapor recovering means for motorcycles which includes means for preventing liquid fuel from wetting the fuel vapor absorbent materials in case of overturn of the motorcycle.

Another object of the present invention is to provide fuel vapor recovering means for motorcycles which includes buffer chamber means for receiving liquid fuel in case of an overturn of the motorcycle to thereby prevent the liquid fuel from reaching the fuel vapor absorbent device.

According to the present invention, the above and other objects can be accomplished by a motorcycle including an internal combustion engine, fuel reservoir means having fueling port means, and cap means adapted for closing the port means, said fueling port means being provided with inner seat means and outer seat means, said cap means including inner cap disc means adapted to be fluid-tightly engaged with said inner seat means and outer cap disc means adapted to be fluid-tightly engaged with said outer seat means to thereby form buffer chamber means between said inner and outer cap means, vent passage means for connecting the buffer chamber means with inside of the fuel reservoir means, fuel vapor absorbent means connected on one hand through conduit means with said buffer chamber means and opened on the other hand to atmosphere. The fuel vapor absorbent means may be in the form of a canister containing activated carbon particles and may be connected with the intake passage of the motorcycle engine as in conventional arrangements.

According to the features of the present invention, the buffer chamber means defined between the outer and inner cap means functions to receive liquid fuel which has passed through the vent passage means when the motorcycle is inadvertently overturned. Therefore, it is possible to prevent the liquid fuel from passing to the fuel vapor absorbent means. It is preferable to connect the conduit means with the buffer chamber means at the longitudinally central portion so that the buffer chamber means functions in a similar manner when the motorcycle falls down on either side.

According to a further feature of the present invention, there is provided valve means which is normally open but closed in case of an overturn of the motorcycle to thereby block the passage to the fuel vapor absorbent means. In one mode of the present invention, such valve means may be located in the conduit means connecting the buffer chamber means with the fuel vapor absorbent means. In another mode, the valve means may be provided in the vent passage means of the inner cap disc means.

The above and other objects and features of the present invention will become apparent from the following descriptions of preferred embodiments taking reference to the accompanying drawings, in which.

Figure 1:
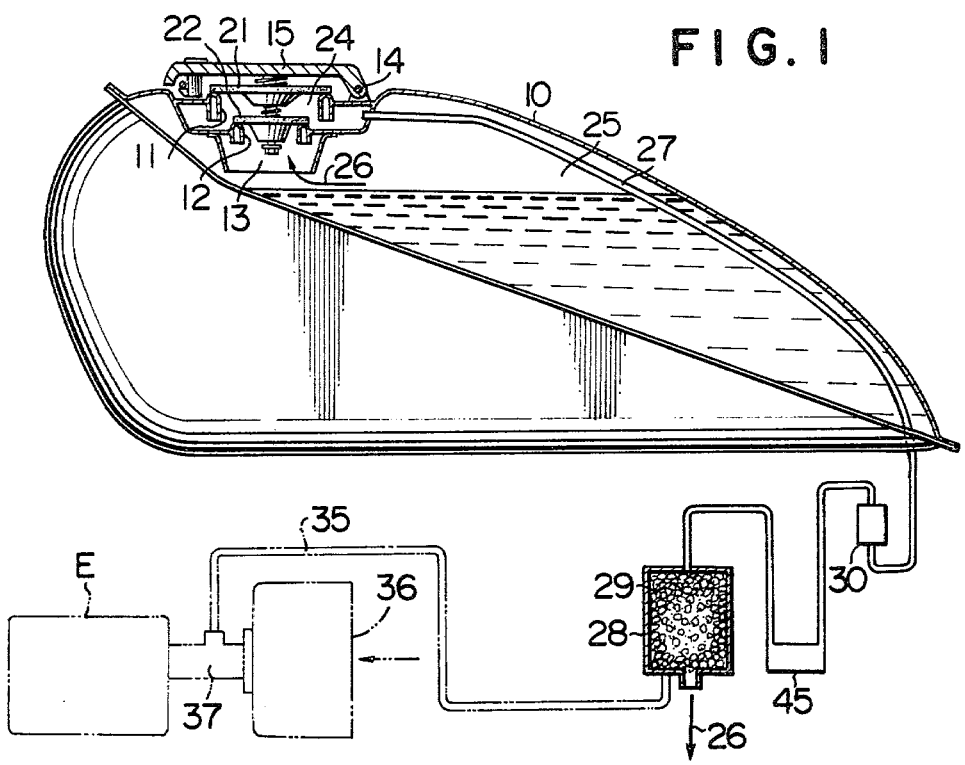
FIG. 1 is a partially cut-away side view of the liquid vapor recovering arrangement embodying the features of the present invention.
Figure 2:
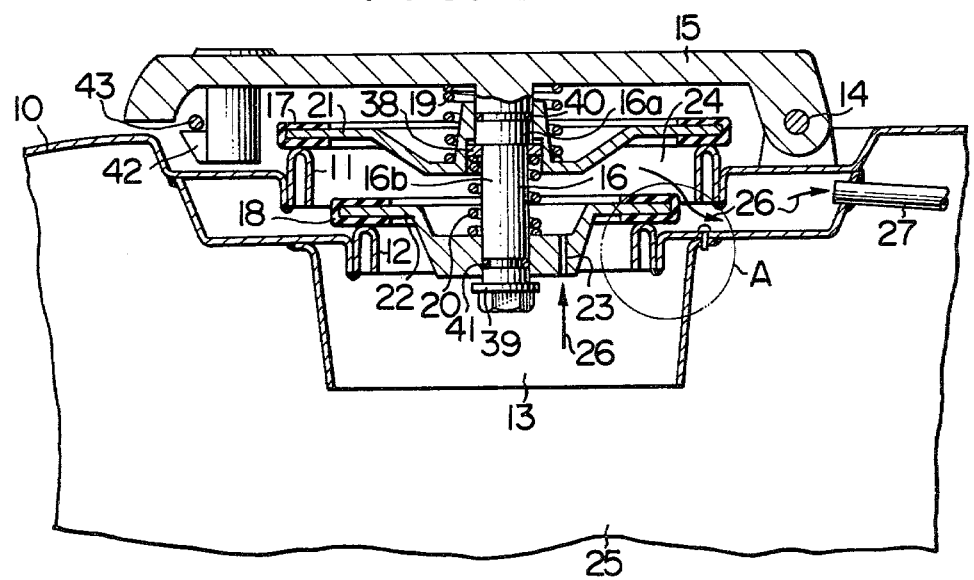
FIG. 2 is an enlarged sectional view of the fuel filler cap arrangement.

Referring to the drawings, particularly to FIG. 1, there is shown a fuel tank 10 for a motorcycle which is formed with a fuel supply port 13 including coaxially arranged outer and inner annular seats 11 and 12, respectively. On the tank 10, there is mounted a filler cap 15 for swingable movement about a hinge pin 14. The cap 15 is provided with a latch member 42 which is adapted to be engaged with a latch pin 43 on the tank 10. As shown in FIG. 2, the filler cap 15 has a central stem 16 extending perpendicularly to the cap 15. The stem 16 includes a large diameter portion 16a and a small diameter portion 16b which respectively receive an outer cap disc 21 and an inner cap disc 22. A spring 19 is disposed between the cap 15 and the outer cap disc 21 to force the cap disc away from the cap 15. At the shoulder defined between the portions 16a and 16b on the stem 16, there is provided a retaining ring 38 for limiting the axial movement of the cap disc 21. The outer cap disc 21 is provided along its periphery with a seal 17 which is adapted to be engaged with the seat 11 when the cap is closed. As shown in FIG. 2, an O-ring 40 is provided on the large diameter portion 16a to provide a fluid-tight seal between the stem 16 and the cap disc 21.

A spring 20 is disposed between the inner cap disc 22 and the retaining ring 38 so as to force the cap disc 22 axially outwardly. A nut 39 is installed on the outer end of the stem 16 for retaining the disc cap 22 against falling off. On the portion 16b of the stem 16, there is an O-ring 41 to provide a fluid-tight seal between the stem 16 and the cap disc 22. The cap disc 22 is provided along the periphery thereof with a seal 18 which is adapted to be engaged with the inner seat 12 when the cap is closed. It should therefore be noted that a chamber, which will hereinafter be referred to as a buffer chamber 24, is defined between the outer and inner cap discs 21 and 22. The inner cap disc 22 is formed with a vent passage 23 which connects the inside space 25 of the fuel tank 10 with the buffer chamber 24.

At the rear end, the buffer chamber 24 is connected with a conduit 27 which leads through a liquid arresting valve 30 and a gas-liquid separator 45 with a canister 28 containing activated carbon particles 29. As conventional in the art, the canister 28 is on one hand opened to atmosphere and on the other hand connected through a conduit 35 with an intake pipe 37 of the engine E leading from an air cleaner 36.

Figure 3:
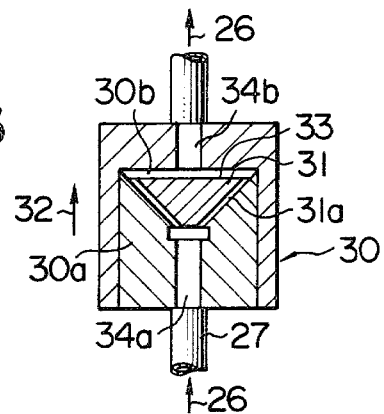
FIG. 3 is a sectional view of the passage blocking valve device.

As shown in FIG. 3, the liquid arresting valve 30 includes a body 30a formed with a valve chamber 30b and an inlet 34a and an outlet 34b. In the valve chamber 30b, there is disposed a valve member 31 which has a gas passage 31a and a planar end surface 33. In the normal position shown in FIG. 3, the inlet 34a is in communication with the outlet 34b through the gas passage 31a and the valve chamber 30b. However, when the motorcycle is turned over, the valve member 31 is shifted to a position wherein the outlet 34b is closed by the end surface 33 of the valve member 31.

In use, when the engine is out of operation, the fuel in the tank 10 may be vaporized and the fuel vapor may then be passed through the vent passage 23 to the buffer chamber 24 and then through the conduit 27, the valve 30 and the liquid-gas separator 45 to the canister 28 as shown by arrows 26. The fuel vapor is then absorbed by the carbon particles 29 in the canister. The fuel vapor may be liquefied in the conduit 27, so that the separator 45 is provided for separating the liquid component from the gas component. When the engine is started, the intake suction pressure prevailing at the intake pipe 37 is applied to the canister 28 so that the fuel which has been absorbed by the carbon particles 29 is drawn through the conduit 35 to the intake pipe 37. As the level of fuel in the tank 10 decreases, vent air is admitted through the conduit 27 to the inside space 25 of the tank 10.

When the motorcycle is inadvertently turned over, the liquid fuel in the tank 10 may flow through the vent passage 23. However, since such liquid fuel is mostly received by the buffer chamber 24, there is very little possibility that the liquid fuel is passed to the conduit 27. Further, even when the liquid fuel is allowed to pass to the conduit 27, it is arrested by the valve 30 so that it is possible to prevent liquid fuel from entering the canister 28 and making the carbon particles 29 wet.

Figure 4:
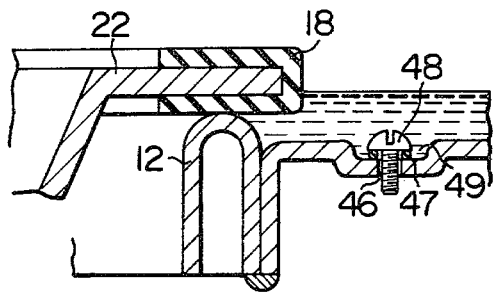
FIG. 4 is an enlarged sectional view showing an example of the fuel drain device.

Referring now to FIG. 4, it will be noted that the fuel tank 10 is formed at the bottom of the buffer chamber 24 with a drain hole 46 which is normally closed by a screw 48 and an O-ring 47. When fuel is trapped in the buffer chamber 24, the screw 48 may be loosened so that the fuel in the chamber 24 is drained into the inside chamber 25 of the tank 10. In order to facilitate the draining of fuel, the hole 46 is formed in a recess 49 provided in the bottom of the buffer chamber 24.

Figure 5:
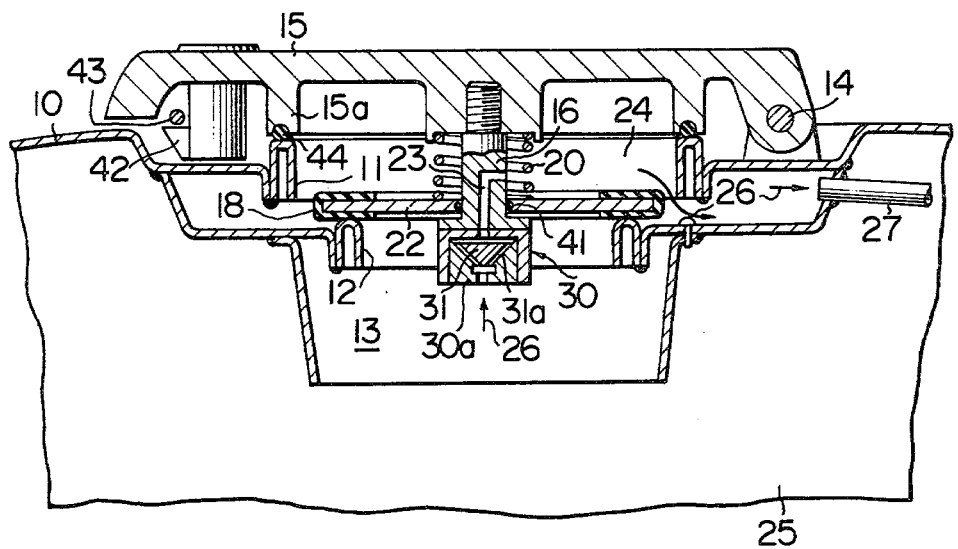
FIG. 5 is a sectional view similar to FIG. 2 but showing another embodiment.

Referring now to FIG. 5, there is shown another embodiment in which the outer cap disc is omitted and the cap 15 is formed with an annular projection 15a for engagement through an O-ring 44 with the upper seat 11. Further, the stem 16 on the cap 16 is formed with a vent passage 23. A liquid arresting valve 30 is mounted on the end of the stem 16 to cooperate with the vent passage 23.

The invention has thus been shown and described with reference to specific embodiments, however, it should be noted that the invention is in no way limited to the details of the illustrated structures but changes and modifications may be made without departing from the scope of the appended claims.

We claim:

1. Fuel system for a motorcycle engine having intake passage means, said fuel system comprising fuel reservoir means having fueling port means, and cap means adapted for closing the port means, said fueling port means being provided with inner seat means and outer seat means, said cap means including inner cap disc means adapted to be fluid-tightly engaged with said inner seat means and outer cap disc means adapted to be fluid-tightly engaged with said outer seat means to thereby form buffer chamber means between said inner and outer cap means, vent passage means for connecting the buffer chamber means with inside of the fuel reservoir means, fuel vapor absorbent means connected on one hand through conduit means with said buffer chamber means and opened on the other hand to atmosphere.

2. Fuel system in accordance with claim 1 in which the conduit means between the buffer chamber means and the fuel vapor absorbent means is provided with liquid arresting valve means which is normally open but closed in case of a overturn of the motorcycle.

3. Fuel system in accordance with claim 1 in which said vent passage means is formed in said inner cap disc means.

4. Fuel system in accordance with claim 1 in which said vent passage means is formed in cap stem means for connecting the outer and inner cap disc means for relative movement.

5. Fuel system in accordance with claim 4 in which said stem means is provided with liquid arresting valve means which is normally open but closed in case of a overturn of the motorcycle.

* * * * *